United States Patent
Iwamura et al.

(10) Patent No.: US 9,969,219 B2
(45) Date of Patent: May 15, 2018

(54) AIRLESS TIRE

(71) Applicant: SUMITOMO RUBBER INDUSTRIES LTD., Kobe-shi (JP)

(72) Inventors: Wako Iwamura, Kobe (JP); Makoto Sugiya, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 0 days. days.

(21) Appl. No.: 14/932,601

(22) Filed: Nov. 4, 2015

(65) Prior Publication Data

US 2016/0200144 A1 Jul. 14, 2016

(30) Foreign Application Priority Data

Jan. 13, 2015 (JP) .................................. 2015-004435

(51) Int. Cl.
*B60C 7/14* (2006.01)
*B60B 1/02* (2006.01)
(Continued)

(52) U.S. Cl.
CPC .................. *B60C 7/14* (2013.01); *B60B 1/02* (2013.01); *B60B 1/0246* (2013.01);
(Continued)

(58) Field of Classification Search
CPC ........ B60C 2007/107; B60C 2007/146; B60C 7/14; B60C 7/143; B60C 7/18;
(Continued)

(56) References Cited

U.S. PATENT DOCUMENTS 6,615,885 B1 * 9/2003 Ohm .................... B60B 9/26
152/11
7,013,939 B2 * 3/2006 Rhyne .................. B60B 1/0223
152/246
(Continued)

FOREIGN PATENT DOCUMENTS

EP 2 801 485 A1 11/2014
JP 2008-260514 A 10/2008
(Continued)

OTHER PUBLICATIONS

Extended Search Report dated Dec. 12, 2016 in European Patent Application No. 15194743.9.

*Primary Examiner* — Kip T Kotter
*Assistant Examiner* — Scott A Browne
(74) *Attorney, Agent, or Firm* — Oblon, McClelland, Maier & Neustadt, L.L.P.

(57) ABSTRACT

An airless tire includes a cylindrical tread ring, a hub and a spoke structure connecting the tread ring and hub. The spoke structure has a tread-side annular component, a hub-side annular component, and spoke plates radially extending from the hub-side to tread-side components, each spoke plate has thickness having first tapered-thickness region, second tapered-thickness region and minimum-thickness region such that the first region radially extending outward has the thickness gradually reducing from first position at which the hub-side component is bonded, the second region radially extending inward has the thickness gradually reducing from second position at which the tread-side component is bonded, and the minimum-thickness region has the minimum thickness between the first and second regions, and the first and second regions are formed such that each of tire radial lengths of the first and second regions is at least 0.05 times a tire radial length of a spoke plate.

20 Claims, 6 Drawing Sheets

(51) Int. Cl.
 *B60B 9/26* (2006.01)
 *B60C 7/18* (2006.01)
(52) U.S. Cl.
 CPC .............. *B60B 1/0261* (2013.01); *B60B 9/26* (2013.01); *B60C 7/18* (2013.01); *B60C 2007/146* (2013.01)
(58) Field of Classification Search
 CPC ....... B60B 1/0246; B60B 1/0261; B60B 9/26; B60B 1/02; B60B 5/02
 See application file for complete search history.

(56) References Cited

U.S. PATENT DOCUMENTS

| | | | |
|---|---|---|---|
| 8,651,156 B2* | 2/2014 | Fadel | B60O 7/18 152/155 |
| 2006/0113016 A1 | 6/2006 | Cron et al. | |
| 2012/0067481 A1* | 3/2012 | Cron | B60O 7/18 152/326 |
| 2013/0278044 A1* | 10/2013 | Dotson | B29D 30/02 301/62 |
| 2015/0174953 A1* | 6/2015 | Cron | B60B 9/26 152/11 |

FOREIGN PATENT DOCUMENTS

| | | | | |
|---|---|---|---|---|
| JP | 2012006560 A | * | 1/2012 | .............. B60C 7/14 |
| JP | 2014-118116 A | | 6/2014 | |
| WO | WO 2013/152067 | | 10/2013 | |
| WO | WO 2014/188912 A1 | | 11/2014 | |
| WO | WO 2014/201368 | | 12/2014 | |

* cited by examiner

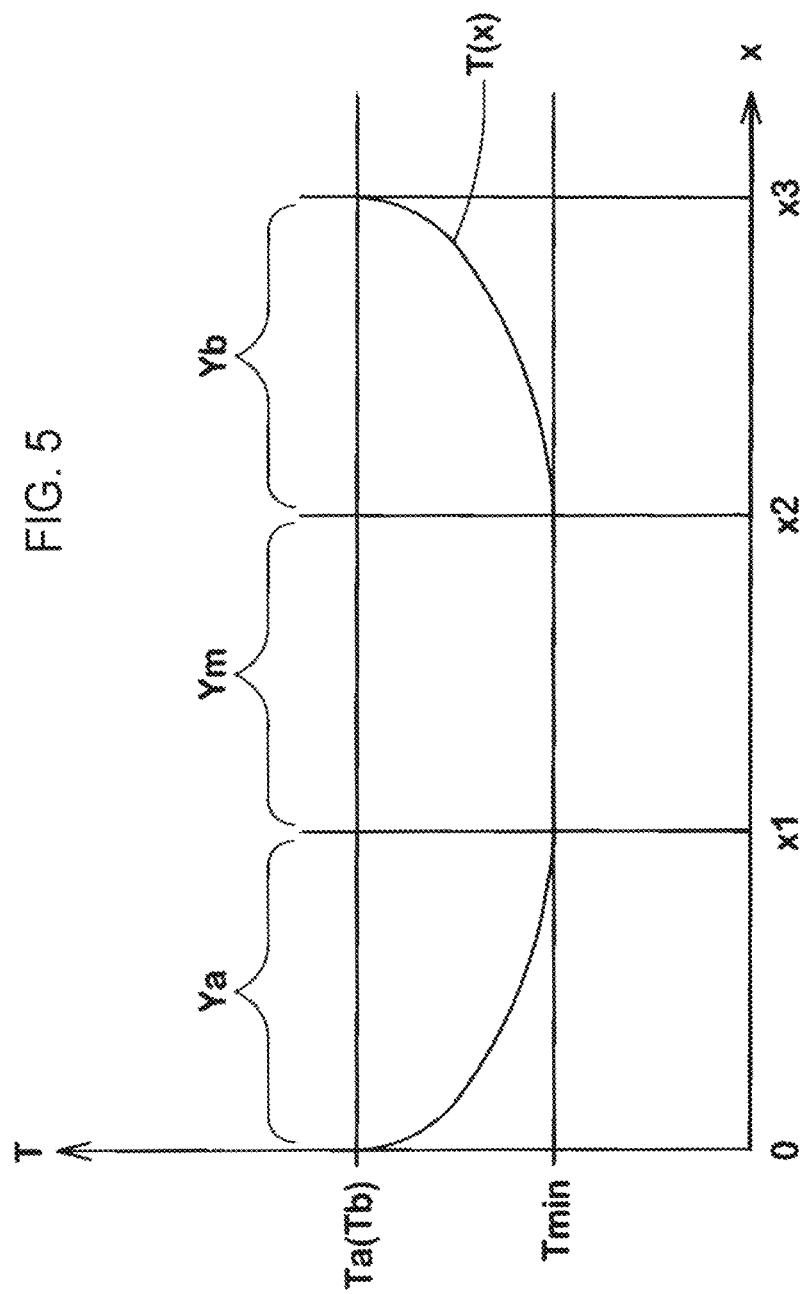

PRIOR ART

AIRLESS TIRE

CROSS-REFERENCE TO RELATED APPLICATIONS

The present application is based upon and claims the benefit of priority to Japanese Patent Application No. 2015-004435, filed Jan. 13, 2015, the entire contents of which are incorporated herein by reference.

BACKGROUND OF THE INVENTION

Field of the Invention

The present invention relates to an airless tire with enhanced durability achieved by suppressing damage to the spoke.

Description of Background Art

JP2008-260514A describes an airless tire, where spoke is formed by radially arranging multiple spoke plates between tread ring and hub. The entire contents of this publication are incorporated herein by reference.

SUMMARY OF THE INVENTION

According to one aspect of the present invention, an airless tire includes a tread ring having a cylindrical form and having a contact patch, a hub positioned on a tire radially inner side of the tread ring and formed to be fixed to an axle, and a spoke structure including a polymer material and connecting the tread ring and the hub. The spoke structure integrally has a tread-side annular component bonded to an inner circumferential surface of the tread ring, a hub-side annular component bonded to an outer circumferential surface of the hub, and spoke plates radially extending from the hub-side annular component to the tread-side annular component, each of the spoke plates has a thickness having a first tapered-thickness region, a second tapered-thickness region and a minimum-thickness region such that the first tapered-thickness region is radially extending outward and has the thickness gradually reducing from a first connecting position at which the hub-side annular component is bonded, the second tapered-thickness region is radially extending inward and has the thickness gradually reducing from a second connecting position at which the tread-side annular component is bonded, and the minimum-thickness region has the minimum thickness formed between the first and second tapered-thickness regions, and the first tapered-thickness region and the second tapered-thickness region are formed such that each of a tire radial length L1 of the first tapered-thickness region and a tire radial length L2 of the second tapered-thickness region is set to be at least 0.05 times a tire radial length L0 of a respective one of the spoke plates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is the graph of a function T(x) representing the thickness of a spoke plate.

DETAILED DESCRIPTION OF THE EMBODIMENTS

Figure 1:
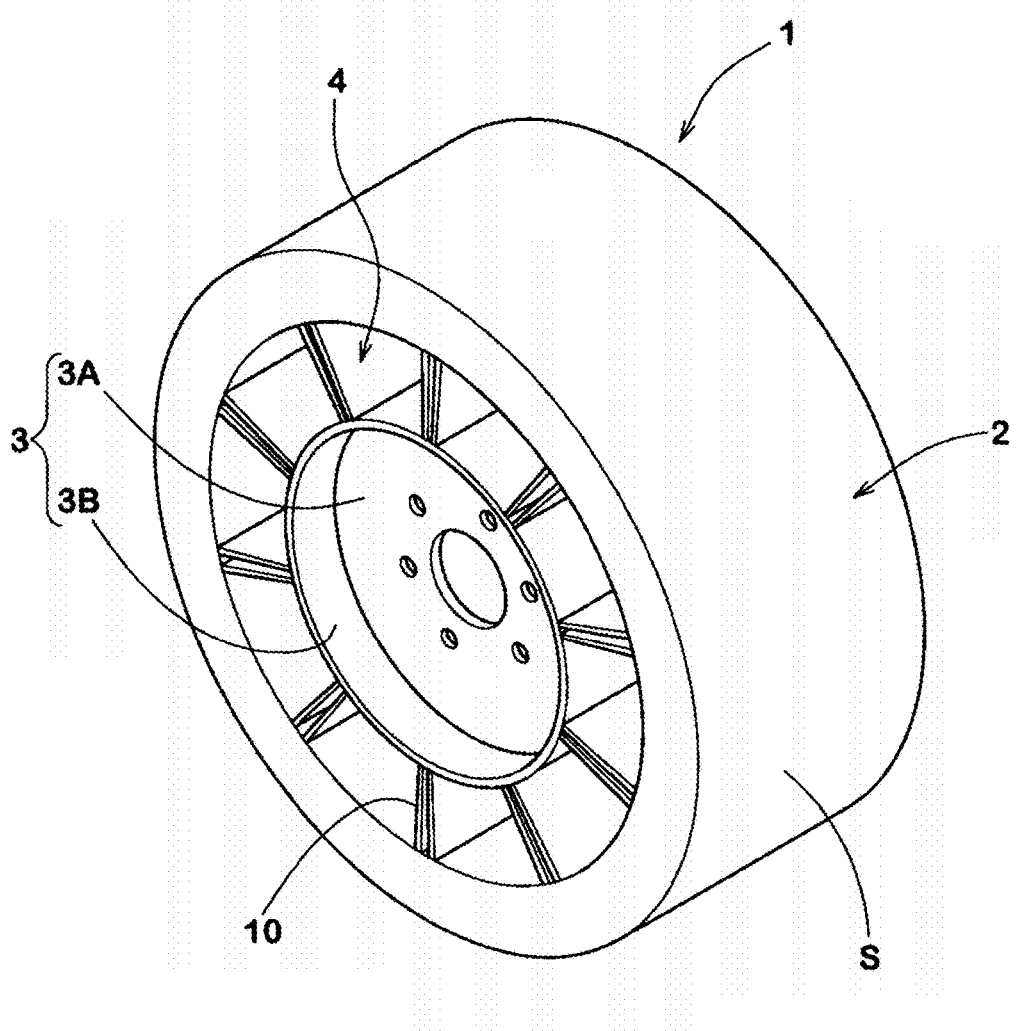
FIG. 1 is a perspective view showing an airless tire according to an embodiment of the present invention.

The embodiments will now be described with reference to the accompanying drawings, wherein like reference numerals designate corresponding or identical elements throughout the various drawings.

Figure 2:
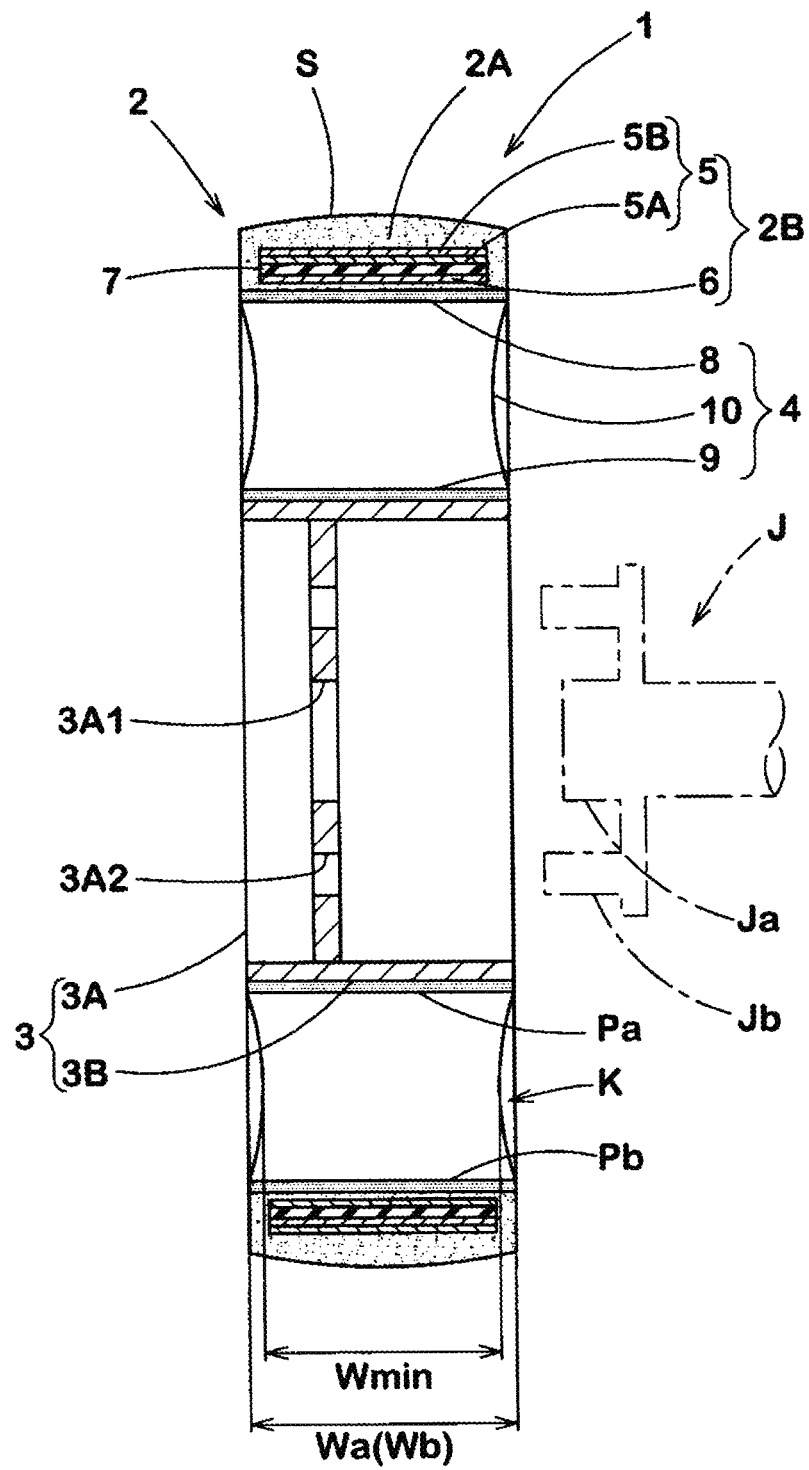
FIG. 2 is a cross-sectional view of the airless tire in a tire axial direction.

As shown in FIGS. 1 and 2, airless tire 1 of the present embodiment has cylindrical tread ring 2 having contact patch (S), hub 3 positioned on the radially inner side of tread ring 2 and fixed to axle (J), and spoke 4 made of a polymer material and connecting tread ring 2 and hub 3. In the present embodiment, airless tire 1 is designed to be mounted on a passenger car.

Tread ring 2 corresponds to the tread of a pneumatic tire, and is provided with tread rubber (2A) as contact patch (S) and reinforcing cord layer (2B) positioned on the radially inner side of the contact patch.

Tread rubber (2A) is preferred to be formed with a rubber composition capable of gaining excellent traction on the ground and achieving excellent wear resistance. Tread grooves (not shown) are formed in various patterns on contact patch (S) to improve wet performance.

Reinforcing cord layer (2B) of the present embodiment includes outer breaker 5 positioned on the radially outer side and inner breaker 6 positioned on the radially inner side. Shearing rubber layer 7 made of a highly elastic rubber is positioned between the breakers.

Outer breaker 5 is formed with multiple plies—two outer plies (5A, 5B) in the present embodiment—made of highly elastic reinforcing cords such as steel cords that are positioned to incline at 5~85 degrees, preferably at 10~35 degrees, relative to a tire circumferential direction. Outer breaker 5 is formed by laminating two plies; reinforcing cords in one ply incline in a different direction from those in the other ply so as to cross each other. In addition, inner breaker 6 is formed with one or more plies—one inner ply in the present embodiment—made of highly elastic reinforcing cords such as steel cords that are helically wound in a tire circumferential direction.

Shearing rubber layer 7 is made of a highly elastic rubber having a complex elastic modulus $E^*$ of 70 MPa or greater, preferably 90 MPa or greater. When both sides of such a highly elastic rubber are sandwiched by outer breaker 5 and inner breaker 6, the rigidity of tread ring 2 is significantly enhanced. Accordingly, an excellent rolling motion of the tire is secured.

Hub 3 corresponds to a tire wheel. In the present embodiment, hub 3 is provided with disc portion (3A) fixed to axle (J), and cylindrical spoke coupling portion (3B) integrated with disc portion (3A) on its radially outer edge. Hub hole (3A1) for inserting front end (Ja) of axle (J) is formed in the center of disc portion (3A). Around hub hole (3A1), multiple bolt insertion holes (3A2) are formed so that bolts (Jb) on the axle side are fastened with nuts. Hub 3 is preferred to be made of metallic material such as steel, aluminum alloys and magnesium alloys, the same used for tire wheels.

Next, spoke 4 is formed to be integrated with tread ring 2 and hub 3 by cast molding a polymer material. Examples of a polymer material are thermoplastic resins and thermosetting resins. For safety reasons, thermosetting resins are preferred; for example, epoxy resins, phenolic resins, urethane resins, silicone resins, polyimide resins, melamine resins and the like. Especially, urethane resins are more preferable because of their excellent elastic properties.

Spoke 4 is formed by integrating the following: tread-side annular component 8 bonded to the inner circumferential surface of tread ring 2 using an adhesive or the like; hub-side annular component 9 bonded to the outer circumferential surface of hub 3 using an adhesive or the like; and multiple spoke plates 10 radially extending from hub-side annular component 9 to tread-side annular component 8. Tread-side annular component 8 and hub-side annular component 9 are omitted from FIG. 1.

Figure 3:
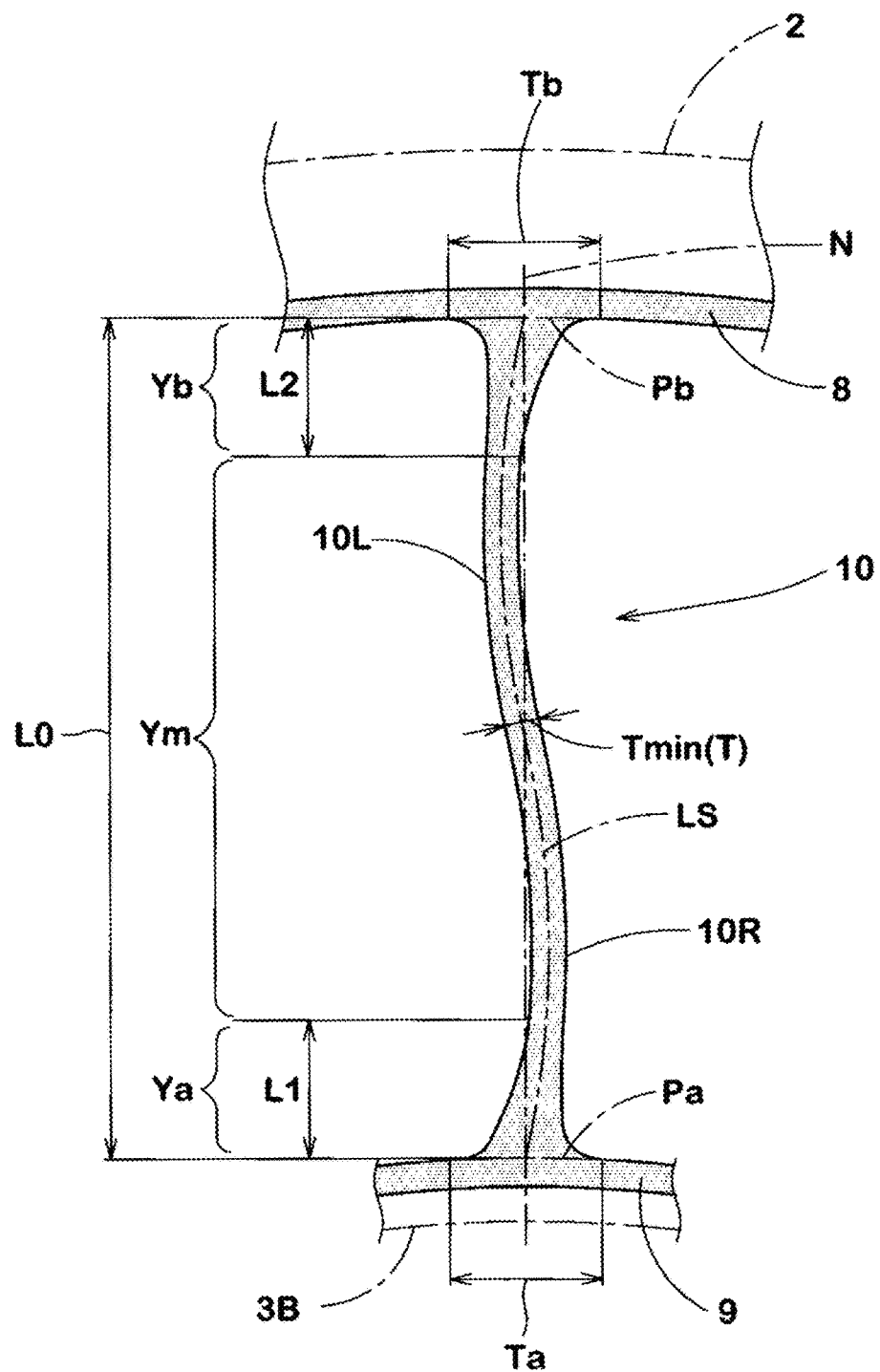
FIG. 3 is a cross-sectional view of a spoke plate in a direction perpendicular relative to a tire axial direction.

As FIG. 3 shows an enlarged view, spoke plate 10 is connected to hub-side annular component 9 at first connecting position (Pa), and to tread-side annular component 8 at second connecting position (Pb). First and second connecting positions (Pa, Pb) are positioned on base line (N) that radially extends from the tire axis.

In the present embodiment, spoke plate 10 warps in an S shape under no-load conditions of the tire. Namely, spoke plate 10 of the present embodiment is formed in an S shape, made up of spoke curved portion (10L) in an arc protruding in a tire circumferential direction and spoke curved portion (10R) in an arc protruding in the opposite circumferential direction. In such a structure, curved length (LS) measured along the S shape of spoke plate 10 is preferred to be 0.5~7.0%, more preferably 1.0~5.0%, of tire radial length (L0) of spoke plate 10 (straight length measured along base line (N)). By so setting, spoke plate 10 is prevented from buckling, and undergoes bending deformation smoothly. If applicable, spoke plate 10 may be formed straight along base line (N).

Next, thickness (T) of spoke plate 10 is specified as follows. Spoke plate 10 is provided with first tapered-thickness region (Ya) extending radially outward while gradually reducing thickness (T) from first connecting position (Pa), second tapered-thickness region (Yb) extending radially inward while gradually reducing thickness (T) from second connecting position (Pb), and minimum-thickness region (Ym) positioned between the tapered-thickness regions and having minimum-thickness (Tmin). In minimum-thickness region (Ym), thickness (T) is constant. Thickness (Ta) in first connecting position (Pa) and thickness (Tb) in second connecting position (Pb) are set to be equal and each have the maximum value of thickness (T) in the present embodiment. However, either of thicknesses (Ta, Tb) may be set greater than the other. In such a structure, either one has an absolute maximum value, while the other has a relative maximum value.

Tire radial length (L1) of first tapered-thickness region (Ya) and tire radial length (L2) of second tapered-thickness region (Yb) are each set to be at least 0.05 times the tire radial length (L0) of spoke plate 10.

The degree of warping in spoke 4 of an airless tire is significantly greater than that of the sidewall of a pneumatic tire, for example. Thus, if entire spoke plate 10 is set to have a constant thickness by forming an arc shape only at portions to be connected to hub-side annular component 9 and tread-side annular component 8, stress is not dispersed nor mitigated sufficiently. Accordingly, damage may occur near where the arc-shaped surface and the constant-thickness portion are connected. Accordingly, lengths (L1, L2) of first and second tapered-thickness regions (Ya, Yb) are each set to be at least 0.05 times the entire length (L0) of spoke plate 10. By so setting, stress generated during bending deformation is widely dispersed, and damage to spoke plate 10 is suppressed. Lengths (L1, L2) are each preferred to be at least 0.07 times, more preferably 0.1 times, the length (L0). The upper limit of lengths (L1, L2) is not restricted to a certain value. However, a longer than necessary length will result in unwanted weight gain. In addition, if one is longer than the other, the shape when bending deformation occurs will be unbalanced, thus negatively affecting stress distribution. Accordingly, the upper limit value of lengths (L1, L2) is preferred to be no greater than 0.6 times the length (L0), and lengths (L1, L2) are preferred to have a ratio (L1/L2) of 2/3~3/2.

When thickness (T) of a spoke plate is obtained as the output of a function T(x) with respect to a variable (x), which is a tire radial distance from first connecting position (Pa) set as the point of origin, the first derivative T'(x) of the function T(x) obtained by differentiating the function T(x) once is preferred to satisfy formulas (1)~(4) below. In the formulas, x1=L1, x2=L0-L2 and x3=L0.

$$T'(0)=\infty \quad (1)$$

$$T'(x1)=0 \quad (2)$$

$$T'(x2)=0 \quad (3)$$

$$T'(x3)=\infty \quad (4)$$

FIG. 5 shows an example of a function T(x) representing the thickness of spoke plate 10. In formulas (1) and (4) above, the tangent line of function T(x) at x=0 and the tangent line of function T(x) at x=x3 are both vertical in FIG. 5, indicating that spoke plate 10 makes smooth contact with hub-side annular component 9 and tread-side annular component 8. In addition, in formulas (2) and (3) above, the tangent line of function T(x) at x=x1 and the tangent line of function T(x) at x=x2 are both horizontal in FIG. 5, indicating that spoke plate 10 makes smooth contact with minimum-thickness region (Ym). Namely, hub-side annular component 9, first tapered-thickness region (Ya), minimum-thickness region (Ym), second tapered-thickness region (Yb) and tread-side annular component 8 all make one smooth entity without forming a bent point.

In addition, the second derivative T''(x) obtained by differentiating the function T(x) twice is preferred to satisfy formulas (5) and (6) below.

$$T''(x)<0 \quad (0 \le x \le x1) \quad (5)$$

$$T''(x)>0 \quad (x2 \le x \le x3) \quad (6)$$

The above formula (5) indicates that when thickness (T) is reduced from x=0 toward x=x1 in first tapered-thickness region (Ya), the rate of thickness reduction is not constant, but the rate becomes gradually smaller from x=0 toward x=x1. In addition, above formula (6) indicates that when thickness (T) increases from x=x2 toward x=x3 in second tapered-thickness region (Yb), the rate of thickness increase is not constant, but the rate becomes gradually greater from x=x2 toward x=x3. By so setting, stress is dispersed and mitigated more effectively.

The outlines of first and second tapered-thickness regions (Ya, Yb) are not made up of a single arc. In first tapered-thickness region (Ya), the curvature radius is set to increase gradually from first connecting position (Pa) in a tire radially outward direction; and in second tapered-thickness region (Yb), the curvature radius is set to increase gradually from second connecting position (Pb) in a tire radially inward direction.

Figure 4A:
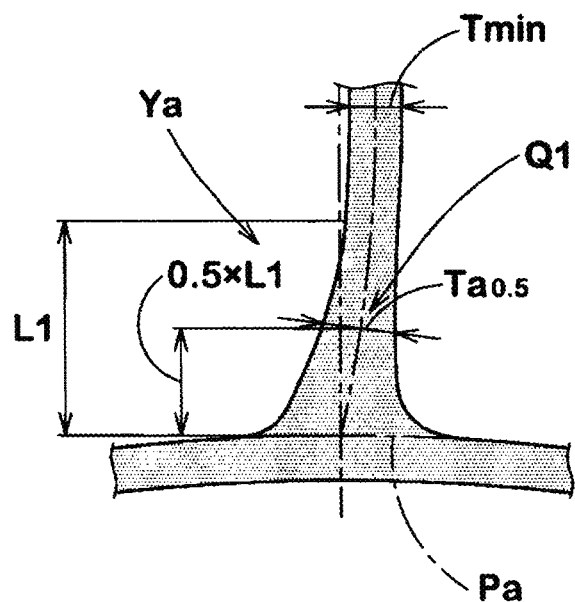
FIG. 4A and FIG. 4B are enlarged cross-sectional views of first and second tapered-thickness regions in a direction perpendicular relative to a tire axial direction.
Figure 4B:
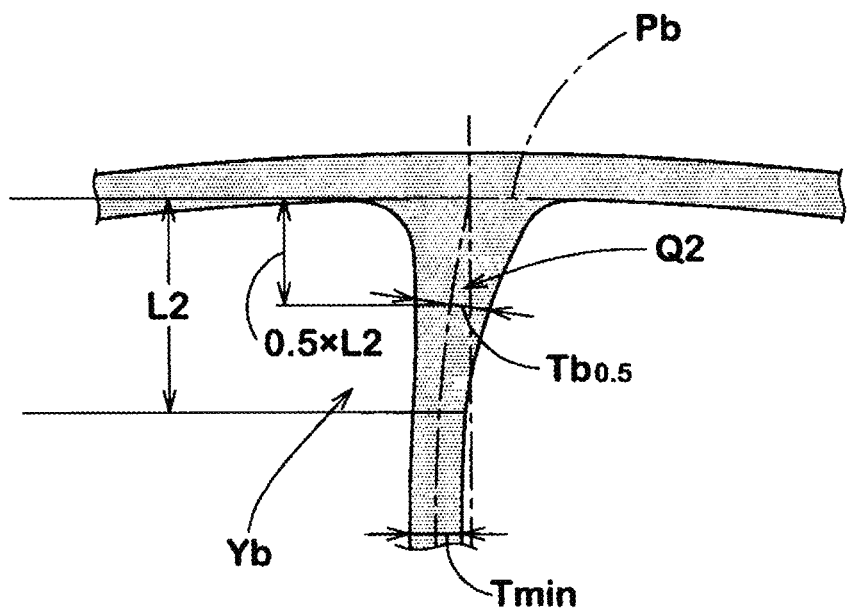

As shown in FIGS. 4A and 4B, in spoke plate 10, thickness ($Ta_{0.5}$) at the tire radially center position (Q1) of first tapered-thickness region (Ya) is preferred to be 1.05~1.5 times the minimum value (Tmin), and thickness ($Tb_{0.5}$) at the tire radially center position (Q2) of second tapered-thickness region (Yb) is preferred to be 1.05~1.5 times the minimum value (Tmin). Radially center position (Q1) indicates that the position is equally distant from both ends (x=0, x=x1) of first tapered-thickness region (Ya). Radially center position (Q2) indicates that the position is equally distant from both ends (x=x2, x=x3) of second tapered-thickness region (Yb). If thicknesses ($Ta_{0.5}$) and ($Tb_{0.5}$) are each less than 1.05 times the minimum value (Tmin), the difference in rigidity with minimum-thickness region (Ym) is too small, and the effects of dispersing stress will be insufficient. Accordingly, cracking is more likely to occur. On the other hand, if thicknesses ($Ta_{0.5}$) and ($Tb_{0.5}$) are each more than 1.5 times the minimum value (Tmin), an unwanted weight gain will result, negatively affecting rolling resistance.

To achieve a lightweight spoke, minimum-width region (K), where tire axial width (W) is at minimum value (Wmin), may be formed between first and second connecting positions (Pa, Pb) of spoke plate 10 as shown in FIG. 2. Minimum-width region (K) is especially preferred to be formed in minimum-thickness region (Ym). In such a structure, minimum value (Wmin) is more preferred to be at least 0.5 times and less than 1.0 times the width (Wa) of first connecting position (Pa), or at least 0.5 times and less than 1.0 times the width (Wb) of second connecting position (Pb). If minimum value (Wmin) is less than 0.5 times the width (Wa) or (Wb), the tensile strength in minimum-width region (K) is too low, and the load support capability of spoke plate 10 is thereby lowered. It is an option not to form minimum-width region (K) so that spoke plate 10 maintains a constant width.

When the elasticity of spoke 4 is too low, the load support capability of spoke 4 is lowered, and the degree of warping increases when a load is exerted on the tire. As a result, the degree of bending deformation of spoke plate 10 increases, and its durability is negatively affected. On the other hand, if the elasticity is too high, the material tends to be fragile, and durability also decreases. From those viewpoints, complex elastic modulus E* of spoke 4 is preferred to be 1~300 MPa, more preferably 5~100 MPa.

Spoke plate 10 may be arrayed parallel relative to a tire axial direction. However, setting spoke plate 10 to incline relative to a tire axial direction is preferred to enhance riding comfort and vibration characteristics.

So far, a preferred embodiment of the present invention has been described in detail. However, the present invention is not limited to what are shown in the accompanying drawings, and various modifications are possible to carry out the present invention.

Examples

Airless tires having the basic structure shown in FIGS. 1 and 2 (corresponding to a tire size 145170R12) were prepared according to the specifications in Table 1, and the durability, tire mass and rolling resistance of each tire were tested. Between a spoke plate and the tread-side annular component and the spoke plate and the hub-side annular component, no tapered-thickness region is formed in Comparative Example 1, and a small arc-shaped tapered-thickness region is formed in Comparative Example 2.

A urethane resin was used for forming a spoke in each test tire. Except for the specifications in Table 1, the rest are substantially the same in each tire. The common specifications for each tread ring are as follows.

Outer Reinforcing Cord Layer
  number of plies: two
  reinforcing cords: steel cords
  angles of cords: +21/−21 degrees
Inner Reinforcing Cord Layer
  number of plies: one
  reinforcing cords: steel cords
  angles of cords: zero degrees (helically wound)
Shearing Rubber Layer
  complex elastic modulus E*: 90 MPa
  thickness: 4 mm (1) Durability Each test tire was driven on a drum-type test machine under conditions of a load (3 kN) and a speed (100 km/h) to measure the distance (km) until trouble occurs in the tire. The greater the value is, the more outstanding the durability is.

(2) Tire Mass

The tire mass was compared by setting the value in Comparative Example 1 as a base value. If a minus (−) is denoted, it means the tire is lighter than that of Comparative Example 1. The unit is in grams.

(3) Rolling Resistance

Using a rolling resistance test machine, rolling resistance coefficients (rolling resistance/load×$10^4$) were measured under conditions of a load (1 kN) and a speed (40 km/h). The results are shown in indices by setting the value obtained in Comparative Example 1 at 100. The smaller the value is, the better the rolling resistance is.

TABLE 1

|  | Comp. Examp. 1 | Comp. Examp. 2 | Example 1 | Example 2 | Comp. Examp. 3 | Example 3 | Example 4 | Example 5 | Example 6 |
| --- | --- | --- | --- | --- | --- | --- | --- | --- | --- |
| 1st Tapered-Thickness Region | not formed | (small arc) |  |  |  | formed |  |  |  |
| 2nd Tapered-Thickness Region | not formed | (small arc) |  |  |  | formed |  |  |  |
| Minimum-Thickness Region | not formed | formed |  |  |  | formed |  |  |  |
| Length (L1) *1 | — | 0.01 | 0.17 | 0.05 | 0.03 |  |  | 0.17 |  |
| Length (L2) *1 | — | 0.01 | 0.17 | 0.05 | 0.03 |  |  | 0.17 |  |
| < 1st Derivative T'(x)> |  |  |  |  |  |  |  |  |  |
| T' (0) |  | — |  |  | ∞ |  |  |  |  |
| T' (x1) |  | — | ≠0 | 0 |  | ≠0 | 0 | 0 | 0 |

TABLE 1-continued

|  | | | | | | | | | |
|---|---|---|---|---|---|---|---|---|---|
| T' (x2) | — | ≠0 | 0 | | 0 | | 0 | ≠0 | 0 |
| T' (x3) | — | | | ∞ | | | | | |
| <2nd Derivative T''(x) > | | | | | | | | | |
| T'' (x) (0 ≤ x ≤ x1) | 0 | 0 | | T'' < 0 | | | | *4 | T'' < 0 |
| T'' (x) (x2 ≤ x ≤ x3) | 0 | 0 | | T'' > 0 | | | | T'' > 0 | *5 |
| Ta$_{0.5}$ *2 | — | — | | | | 1.2 | | | |
| Tb$_{0.5}$ *2 | — | — | | | | 1.2 | | | |
| Wmin *3 | 1.0 | 1.0 | | | | 0.97 | | | |
| Complex Elastic Modulus E* (MPa) | | | | 100 | | | | | |
| Durability | 100 | 500 | 10000 | 4000 | 1000 | 3000 | 3000 | 5000 | 5000 |
| Tire Mass | base value | +30 | +200 | +180 | +150 | +200 | +200 | +200 | +200 |
| Rolling Resistance | 100 | 100 | 100 | 100 | 100 | 100 | 100 | 100 | 100 |

|  | Examp. 7 | Examp. 8 | Examp. 9 | Examp. 10 | Examp. 11 | Examp. 12 | Examp. 13 | Examp. 14 | Examp. 15 | Examp. 16 | Examp. 17 |
|---|---|---|---|---|---|---|---|---|---|---|---|
| 1st Tapered-Thickness Region | | | | | | formed | | | | | |
| 2nd Tapered-Thickness Region | | | | | | formed | | | | | |
| Minimum-Thickness Region | | | | | | formed | | | | | |
| Length (L1) *1 | | | | | | 0.17 | | | | | |
| Length (L2) *1 | | | | | | 0.17 | | | | | |
| < 1st Derivative T'(x)> | | | | | | | | | | | |
| T' (0) | | | | | | ∞ | | | | | |
| T' (x1) | | | | | | 0 | | | | | |
| T' (x2) | | | | | | 0 | | | | | |
| T' (x3) | | | | | | ∞ | | | | | |
| <2nd Derivative T''(x) > | | | | | | | | | | | |
| T'' (x) (0 ≤ x ≤ x1) | | | | | | T'' < 0 | | | | | |
| T'' (x) (x2 ≤ x ≤ x3) | | | | | | T'' > 0 | | | | | |
| Ta$_{0.5}$ *2 | 1.03 | 1.05 | 1.2 | 1.2 | 1.7 | 1.3 | | | 1.2 | | |
| Tb$_{0.5}$ *2 | 1.2 | 1.2 | 1.03 | 1.05 | 1.2 | 1.2 | | | 1.2 | | |
| Wmin *3 | | | 0.97 | | | | 0.4 | 0.5 | 1.1 | 0.97 | 0.97 |
| Complex Elastic Modulus E* (MPa) | | | | | 100 | | | | | 0.5 | 400 |
| Durability | 3000 | 6000 | 3000 | 6000 | 7000 | 8000 | 3000 | 6000 | 10000 | 1000 | 2000 |
| Tire Mass | +200 | +200 | +200 | +200 | +600 | +300 | −300 | −200 | +400 | +200 | +200 |
| Rolling Resistance | 100 | 100 | 100 | 100 | 101 | 100 | 100 | 100 | 102 | 90 | 98 |

*1 Indicated by a ratio to radial length (L0) of the spoke plate.
*2 Indicated by a ratio to minimum value (Tmin) of the spoke plate.
*3 Indicated by a ratio to width (Wa) at the first connecting position (Width (Wa) at the first connecting position is equal to width (Wb) at the second connecting position).
*4 The output does not satisfy T'' < 0.
*5 The output does not satisfy T'' > 0.

As shown in Table 1, it was confirmed that damage is suppressed in tires of the examples and that durability is enhanced.

Figure 6:
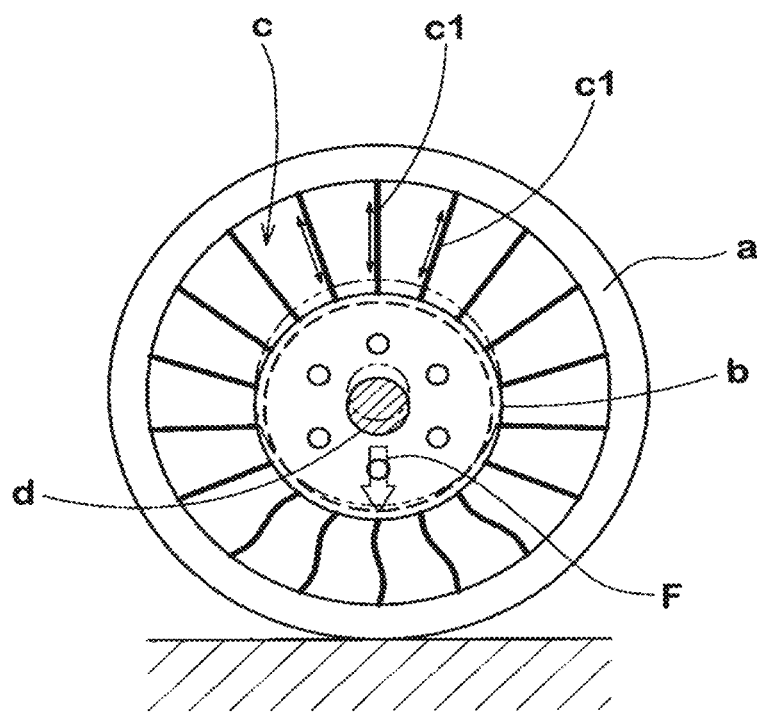
FIG. 6 is a front view schematically showing a conventional airless tire under load conditions.

For a pneumatic tire filled with air at an inflation pressure to support a load, it is almost impossible to totally avoid punctures. To solve such a problem, an airless tire has been proposed in recent years, where spoke (c) is formed by radially arraying multiple spoke plates (c1) between tread ring (a) and hub (b) as schematically shown in FIG. 6, for example. FIG. 6 shows a tire under load conditions.

Regarding the tire having the above structure, hub (b) and axle (d) are suspended by spoke plate (c1) positioned on their upper side. Accordingly, when load (F) is exerted on axle (d), tensile force is exerted on spoke plate (c1) positioned above axle (d) to cause elongation, whereas compression force is exerted on spoke plate (c1) positioned below axle (d) to cause bending deformation.

When bending deformation is repeated, damage to spoke plate (c1) may occur early in the lifespan, and the durability of the airless tire is thereby lowered. Especially, on portions where flexible spoke plate (c1) is connected to less-flexible hub (b) and ring (a), stress concentrates during bending deformation to cause significant strain. Accordingly, damage such as cracking may occur as the connecting portions become weak points.

An airless tire according to an embodiment of the present invention is capable of dispersing stress during bending deformation of a spoke plate by specifying the thickness distribution in the spoke plate so that damage to the spoke plate is suppressed and durability of the tire is enhanced.

An airless tire according to an embodiment of the present invention has a cylindrical tread ring with a contact patch, a hub positioned on the radially inner side of the tread ring and fixed to an axle, and a spoke made of a polymer material and connecting the tread ring and the hub. The spoke is formed by integrating a tread-side annular component bonded to the inner circumferential surface of the tread ring, a hub-side annular component bonded to the outer circumferential surface of the hub, and spoke plates radially extending from the hub-side annular component to the tread-side annular component.

A spoke plate includes a first tapered-thickness region radially extending outward while gradually reducing thickness (T) from a first connecting position bonded to the hub-side annular component, a second tapered-thickness region radially extending inward while gradually reducing thickness (T) from a second connecting position bonded to the tread-side annular component, and a minimum-thickness region with thickness (T) of minimum value (Tmin) positioned between the tapered-thickness regions.

Tire radial length (L1) of the first tapered-thickness region and tire radial length (L2) of the second tapered-thickness region are each set to be at least 0.05 times the tire radial length (L0) of the spoke plate.

In an airless tire according to an embodiment of the present invention, when thickness (T) of the spoke plate is obtained as the output of a function T(x) with respect to a variable (x), which is a tire radial distance measured from the first connecting position set as the point of origin, the first derivative T'(x) of the function T(x) is preferred to satisfy formulas (1)~(4) below.

$$T'(0)=\infty \quad (1)$$

$$T'(x1)=0 \quad (2)$$

$$T'(x2)=0 \quad (3)$$

$$T'(x3)=\infty \quad (4)$$

(x1=L1, x2=L0-L2, x3=L0 in the above formulas)

In an airless tire according to an embodiment of the present invention, when thickness (T) of the spoke plate is obtained as the output of a function T(x) with respect to a variable (x), which is a tire radial distance measured from the first connecting position set as the point of origin, the second derivative T''(x) of the function T(x) is preferred to satisfy formulas (5) and (6) below.

$$T''(x)<0 \quad (0 \leq x \leq x1) \quad (5)$$

$$T''(x)>0 \quad (x2 \leq x \leq x3) \quad (6)$$

(x1=L1, x2=L0-L2, x3=L0 in the above formulas)

In an airless tire according to an embodiment of the present invention, thickness ($Ta_{0.5}$) at the tire radially center position of the first tapered-thickness region is preferred to be 1.05~1.5 times the minimum value (Tmin), and thickness ($Tb_{0.5}$) at the tire radially center position of the second tapered-thickness region is preferred to be 1.05~1.5 times the minimum value (Tmin).

In an airless tire according to an embodiment of the present invention, the spoke plate is preferred to have a minimum-width region where tire axial width (W) is at minimum value (Wmin) between the first and second connecting positions. Minimum value (Wmin) is preferred to be at least 0.5 times but less than 1.0 times the width (Wa) at the first connecting position, or at least 0.5 times but less than 1.0 times the width (Wb) at the second connecting position.

In an airless tire according to an embodiment of the present invention, complex elastic modulus E* of the spoke is preferred to be 1~300 MPa.

In the present specification, complex elastic modulus E* is measured by using a viscoelastic spectrometer "VES" (made by Iwamoto Seisakusho) at a temperature of 30° C., a frequency of 10 Hz, an initial strain of 10% and a dynamic strain of 2% under a tensile mode.

As described above, a spoke plate related to the present invention includes a first tapered-thickness region radially extending outward while gradually reducing thickness (T) from a first connecting position bonded to the hub-side annular component, a second tapered-thickness region radially extending inward while gradually reducing thickness (T) from a second connecting position bonded to the tread-side annular component, and a minimum-thickness region positioned between the tapered-thickness regions. In addition, radial lengths (L1, L2) of the first and second tapered-thickness regions are each set to be at least 0.05 times the radial length (L0) of the spoke plate.

Here, the degree of warping in the spoke of an airless tire is significantly greater than that of the sidewall of a pneumatic tire, for example. Thus, if the spoke plate is set to have a constant thickness by forming an arc shape only at portions connected to the hub-side and tread-side annular components, stress is not dispersed or mitigated sufficiently. Accordingly, damage may occur near where the arc-shaped surface and the constant-thickness portion are connected.

In an embodiment of the present invention, considering the above concerns, lengths (L1, L2) of the first and second tapered-thickness regions are each set to be at least 0.05 times the length (L0) of the spoke plate so that the tapered-thickness regions are formed in a greater range. Accordingly, stress is more widely dispersed in the spoke plate during bending deformation, and damage to the spoke plate is suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. An airless tire, comprising:
   a tread ring having a cylindrical form and having a contact patch;
   a hub positioned on a tire radially inner side of the tread ring and configured to be fixed to an axle; and
   a spoke structure comprising a polymer material and connecting the tread ring and the hub,
   wherein the spoke structure integrally comprises a tread-side annular component bonded to an inner circumferential surface of the tread ring, a hub-side annular component bonded to an outer circumferential surface of the hub, and a plurality of spoke plates radially extending from the hub-side annular component to the tread-side annular component, each of the spoke plates has a thickness having a first tapered-thickness region, a second tapered-thickness region and a minimum-thickness region such that the first tapered-thickness region is radially extending outward and has the thickness gradually reducing from a first connecting position on the hub-side annular component, the second tapered-thickness region is radially extending inward and has the thickness gradually reducing from a second connecting position on the tread-side annular component, and the minimum-thickness region has the minimum thickness formed between the first and second tapered-thickness regions, the first tapered-thickness region and the second tapered-thickness region are formed such that each of a tire radial length L1 of the first tapered-thickness region and a tire radial length L2 of the second tapered-thickness region is set to be at least 0.05 times a tire radial length L0 of a respective one of the spoke plates, each of the spoke plates has a first spoke curved portion extending from the tread-side annular component in an arc protruding in a tire circumferential direction and a second spoke curved portion extending from the hub-side annular component to the first spoke curve portion in an arc protruding in an opposite tire circumferential direction such that the first and second spoke curved portions form an S shape under a no-load condition and have a curved length LS extending along the S shape between the tread-side annular component and the hub-side annular component, and a radially inner portion of the first spoke curved portion extends in an arc in the tire circumferential direction and a radially outer portion of the second spoke curved portion extends in an arc in the opposite tire circumferential direction.

2. The airless tire according to claim 1, wherein when the thickness of each of the spoke plates is set to be an output of a function T(x) with respect to a variable (x), which is a tire radial distance measured from the first connecting position set as a point of origin, a first derivative T'(x) of the function T(x) satisfies T'(0)=∞, T'(x1)=0, T'(x2)=0, T'(x3)=∞, where x1=L1, x2=L0−L2, and x3=L0.

3. The airless tire according to claim 1, wherein when the thickness of each of the spoke plates is set to be an output of a function T(x) with respect to a variable (x), which is a tire radial distance measured from the first connecting position set as a point of origin, a second derivative T"(x) of the function T(x) satisfies T"(x)<0 and 0≤x≤x1, and T"(x)>0 and x2≤x≤x3, where x1=L1, x2=L0−L2, and x3=L0.

4. The airless tire according to claim 1, wherein the first tapered-thickness region has a thickness $Ta_{0.5}$ at a tire radially center position such that the thickness $Ta_{0.5}$ is set to be in a range of 1.05 to 1.5 times a minimum value Tmin, and the second tapered-thickness region has a thickness $Tb_{0.5}$ at a tire radially center position such that the thickness $Tb_{0.5}$ is set to be in a range of 1.05 to 1.5 times the minimum value Tmin.

5. The airless tire according to claim 1, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wa at the first connecting position.

6. The airless tire according to claim 1, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wb at the second connecting position.

7. The airless tire according to claim 1, wherein the spoke structure is formed such that complex elastic modulus E* of the spoke structure is set to be in a range of 1 MPa to 300 MPa.

8. The airless tire according to claim 2, wherein a second derivative T"(x) of the function T(x) satisfies T"(x)<0 and 0≤x≤x1, and T"(x)>0 and x2≤x≤x3, where x1=L1, x2=L0−L2, and x3=L0.

9. The airless tire according to claim 2, wherein of the first tapered-thickness region has a thickness $Ta_{0.5}$ at a tire radially center position such that the thickness $Ta_{0.5}$ is set to be in a range of 1.05 to 1.5 times a minimum value Tmin, and the second tapered-thickness region has a thickness $Tb_{0.5}$ at a tire radially center position such that the thickness $Tb_{0.5}$ is set to be in a range of 1.05 to 1.5 times the minimum value Tmin.

10. The airless tire according to claim 2, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wa at the first connecting position.

11. The airless tire according to claim 2, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wb at the second connecting position.

12. The airless tire according to claim 2, wherein the spoke structure is formed such that complex elastic modulus E* of the spoke structure is set to be in a range of 1 MPa to 300 MPa.

13. The airless tire according to claim 3, wherein of the first tapered-thickness region has a thickness $Ta_{0.5}$ at a tire radially center position such that the thickness $Ta_{0.5}$ is set to be in a range of 1.05 to 1.5 times a minimum value Tmin, and the second tapered-thickness region has a thickness $Tb_{0.5}$ at a tire radially center position such that the thickness $Tb_{0.5}$ is set to be in a range of 1.05 to 1.5 times the minimum value Tmin.

14. The airless tire according to claim 3, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wa at the first connecting position.

15. The airless tire according to claim 3, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wb at the second connecting position.

16. The airless tire according to claim 3, wherein the spoke structure is formed such that complex elastic modulus E* of the spoke structure is set to be in a range of 1 MPa to 300 MPa.

17. The airless tire according to claim 4, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wa at the first connecting position.

18. The airless tire according to claim 4, wherein each of the spoke plates has a minimum-width region in which a tire axial width W has a minimum value Wmin between the first connecting position and the second connecting position, and the minimum value Wmin is set to be in a range of at least 0.5 times to less than 1.0 times a width Wb at the second connecting position.

19. The airless tire according to claim 4, wherein the spoke structure is formed such that each of the spoke plates has the S shape having the curved length LS in a range of 0.5% to 7.0% of the tire radial length L0.

20. The airless tire according to claim 5, wherein the spoke structure is formed such that each of the spoke plates has the S shape having the curved length LS in a range of 1.0% to 5.0% of the tire radial length L0.

* * * * *